(12) United States Patent
Wu et al.

(10) Patent No.: US 9,927,099 B2
(45) Date of Patent: Mar. 27, 2018

(54) OPTICAL-WAVELENGTH CONVERTING WHEEL COMPONENT

(75) Inventors: Xiliang Wu, Shenzhen (CN); Yi Li, Pleasanton, CA (US); Yi Yang, Shenzhen (CN)

(73) Assignee: APPROTRONICS CORPORATION, Shenzhen (CN)

( * ) Notice: Subject to any disclaimer, the term of this patent is extended or adjusted under 35 U.S.C. 154(b) by 245 days.

(21) Appl. No.: 14/003,797

(22) PCT Filed: Feb. 24, 2012

(86) PCT No.: PCT/CN2012/071630
§ 371 (c)(1),
(2), (4) Date: Oct. 30, 2013

(87) PCT Pub. No.: WO2012/119515
PCT Pub. Date: Sep. 13, 2012

(65) Prior Publication Data
US 2014/0043829 A1  Feb. 13, 2014

(30) Foreign Application Priority Data
Mar. 8, 2011  (CN) ............. 2011 2 0059117 U

(51) Int. Cl.
*F21V 13/08*  (2006.01)
*G02B 26/00*  (2006.01)

(52) U.S. Cl.
CPC ............ *F21V 13/08* (2013.01); *G02B 26/008* (2013.01)

(58) Field of Classification Search
CPC .......... G02B 5/26; G02B 5/204; G02B 5/206; G02B 5/223; G02B 5/202; G02B 6/0003;
(Continued)

(56) References Cited

U.S. PATENT DOCUMENTS 5,825,337 A * 10/1998 Wiseman ........... H04N 13/0409
                                                         345/4
6,755,554 B2 * 6/2004 Ohmae et al. ................ 362/293
(Continued)

FOREIGN PATENT DOCUMENTS

CN      101539270          9/2009
CN      101539270  A   *   9/2009
(Continued)

OTHER PUBLICATIONS

Machine Translation of JP 2006-285088 A.*
(Continued)

*Primary Examiner* — Jong-Suk (James) Lee
*Assistant Examiner* — Christopher E Dunay
(74) *Attorney, Agent, or Firm* — Chen Yoshimura LLP

(57) ABSTRACT

An optical-wavelength converting wheel component comprises a motor (1) and an optical-wavelength converting wheel (2). The optical-wavelength converting wheel (2) comprises an optical-wavelength converting material layer (21) and at least one functional layer adjacent to the optical-wavelength converting material layer (21), particularly the optical-wavelength converting wheel (2) further comprises at least one spacing layer (26), which is a thin gap spaced between the location of the optical-wavelength converting material on the optical wavelength converting material layer (21) and the functional layer, arranged between the optical-wavelength converting material layer (21) and the functional layer. Brightening can be realized in low cost by means of adopting a light source comprising the optical-wavelength converting wheel component.

6 Claims, 3 Drawing Sheets

(58) Field of Classification Search
CPC ........... G02B 6/0026; G02B 5/20; F21V 9/08; F21V 9/10
USPC ............................................. 362/293; 353/84
See application file for complete search history.

(56) References Cited

U.S. PATENT DOCUMENTS

| | | | | |
|---|---|---|---|---|
| 2002/0070931 | A1* | 6/2002 | Ishikawa ................ | G02B 5/284 345/204 |
| 2004/0233512 | A1 | 11/2004 | Fujioka et al. | |
| 2007/0086098 | A1* | 4/2007 | Sekiguchi ............ | G02B 26/008 359/892 |
| 2007/0229683 | A1* | 10/2007 | Larson et al. ................ | 348/269 |
| 2009/0284148 | A1* | 11/2009 | Iwanaga .............. | G02B 26/008 313/506 |
| 2010/0328626 | A1* | 12/2010 | Miyazaki ............. | H04N 9/3114 353/85 |
| 2011/0299155 | A1* | 12/2011 | McCarthy .................... | 359/359 |
| 2011/0304830 | A1* | 12/2011 | Kato et al. ..................... | 353/84 |

FOREIGN PATENT DOCUMENTS

| | | |
|---|---|---|
| CN | 101799583 | 8/2010 |
| CN | 101805602 | 8/2010 |
| CN | 202040748 | 11/2011 |
| DE | 19625374 | 1/1998 |
| JP | 2004349325 | 12/2004 |
| JP | 2006285088 A * | 10/2006 |

OTHER PUBLICATIONS

Machine Translation of CN 101539270 A.*
International Search Report in the parent PCT application No. PCT/CN2012/071630, dated May 3, 2012.
IPRP in the parent PCT application No. PCT/CN2012/071630, dated May 3, 2012.

* cited by examiner

OPTICAL-WAVELENGTH CONVERTING WHEEL COMPONENT

BACKGROUND OF THE INVENTION

Field of the Invention

This invention relates to a color wheel component which can control the color or direction of output light.

Description of the Related Art

To provide high power, high brightness projection light, current projectors are moving toward using light sources based on wavelength conversion principles. In this type of light sources, using wavelength conversion wheel devices have the advantage of extended life and enhanced light conversion efficiency.

Current wavelength conversion wheel devices typically include a motor and a wavelength conversion wheel. Based on the light travelling direction on the wavelength conversion wheel, wavelength conversion wheel devices fall into two main categories.

The first category uses transmission type wavelength conversion wheels. As shown in FIG. 1, the wavelength conversion wheel device includes a motor 1, and a wavelength conversion wheel 2 having a stacked multi-layer structure: dichroic reflector 22, wavelength conversion material layer 21 and filter plate 23. To save materials, the wavelength conversion material 211 on the wavelength conversion material layer 21 has a ring shaped distribution, where the area 212 inside the ring or an area outside of the ring does not carry any wavelength conversion materials because it is not in the illumination path of the excitation light. The working principle of this type of wavelength conversion wheel is illustrated in FIG. 2. The excitation light 4 passes through the dichroic reflector 22 to illuminate the wavelength conversion material layer 21. The wavelength conversion material generates a converted light in all directions. The converted light traveling toward the filter 23 will pass through the filter 23 to become the output light 51 of the light source device; the converted light 50 traveling toward the dichroic reflector 22 will be partially reflected by the reflecting face 221 back to the wavelength conversion material layer 21. Another part of the converted light (e.g. 52) will pass through the dichroic reflector 22 and become lost.

The second category uses reflection type wavelength conversion wheels. As shown in FIG. 3, the wavelength conversion wheel device includes a motor 1, and a wavelength conversion wheel 2 having a stacked multi-layer structure: reflector 24 (such as but is not limited to metal reflector plates), and wavelength conversion material layer 21. The working principle of this type of wavelength conversion wheel is as follows. The excitation light illuminates the wavelength conversion material layer 21; a part of the excitation light that is not absorbed by the wavelength conversion material will be reflected by the reflector 24 back to the wavelength conversion material layer 21. The converted light generated by the wavelength conversion material travels in all directions. Of the converted light traveling toward the reflector 24, a major portion will be reflected by the reflector 24 back to the wavelength conversion material layer 21; a minor portion of the converted light will be absorbed by the reflector 24 and become lost.

A problem with the above two types of conventional devices is that in both the transmission type and the reflection type wavelength conversion wheel devices, a part of the converted light is lost. This adversely affects the output brightness of the light source device. In particular, for the transmission type device, because the wavelength conversion material layer 21 directly contacts the filter 23, converted light 51 that exits at large angles will increase the output light spot size of the light source device.

SUMMARY OF THE INVENTION

The present invention is directed to a wavelength conversion wheel device that substantially obviates one or more of the problems due to limitations and disadvantages of the related art. An object of the present invention is to increase the brightness of the light source using a simple structure.

To achieve these and other advantages and in accordance with the purpose of the present invention, the present invention provides a wavelength conversion wheel device which includes a motor and a wavelength conversion wheel; the wavelength conversion wheel including a wavelength conversion material layer and at least one functional layer adjacent the wavelength conversion material layer; in particular, the wavelength conversion wheel further includes at least one spacing layer disposed between the wavelength conversion material layer and the functional layer, such that at the location of the wavelength conversion material, the wavelength conversion material layer is spaced apart from the functional layer by an air gap no thicker than 10% of a width of the wavelength conversion material in a radial direction.

In some embodiment, the functional layer includes a reflector that reflects the converted light generated by the wavelength conversion material and the unabsorbed portion of the excitation light. Alternatively, the functional layer includes a dichroic reflector which transmits the excitation light and reflects the converted light. Further, the wavelength conversion wheel device may include a filter, where the filter and the dichroic reflector are respectively disposed on two sides of the wavelength conversion material layer, the filter being used to select the wavelength or output angle of the output light.

In the above embodiments, the spacing layer is a rigid plate having an inner portion and an outer ring separated by a hollow section, and at least two reinforcing bridges connecting the inner portion and the outer ring.

Embodiments of the present invention have the advantage of easy to manufacture, low cost, and high value.

DETAILED DESCRIPTION OF THE PREFERRED EMBODIMENTS

Preferred embodiments of the present invention are described with reference to the drawings.

Figure 1:
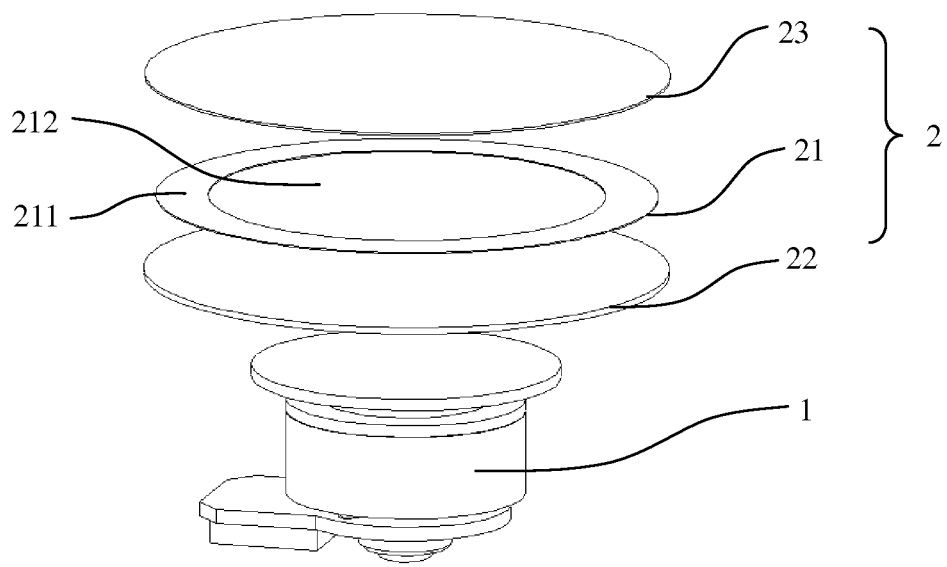
FIG. 1 is a partial exploded view of the structure of a conventional transmission type wavelength conversion wheel device.
Figure 2:
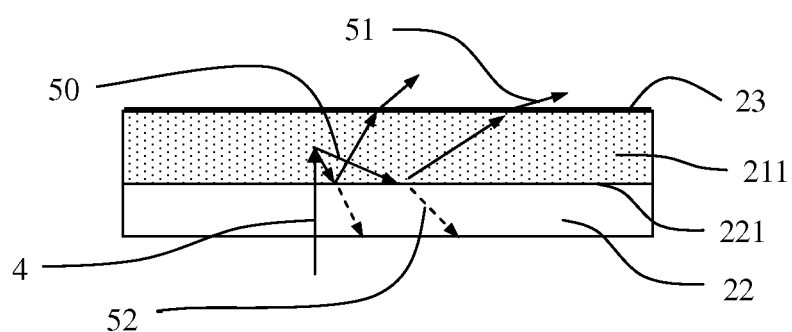
FIG. 2 illustrates the light transmission for the wavelength conversion wheel device of FIG. 1.
Figure 3:
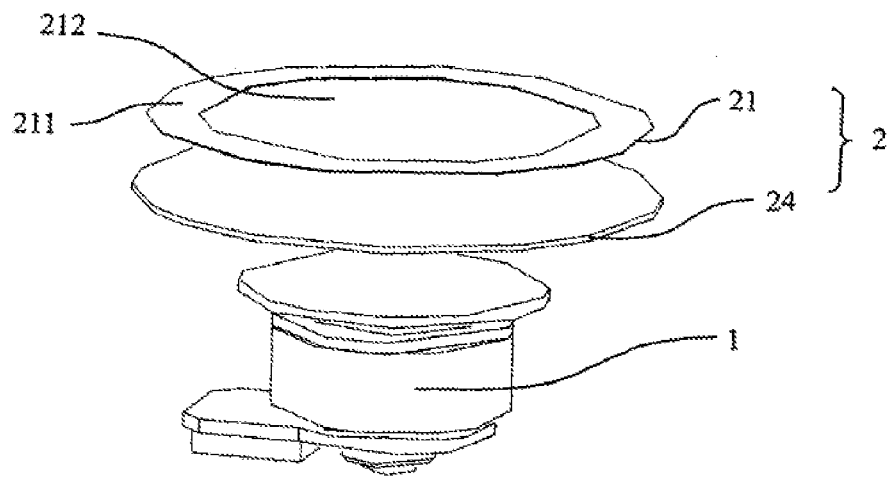
FIG. 3 is a partial exploded view of the structure of a conventional reflection type wavelength conversion wheel device.
Figure 4:
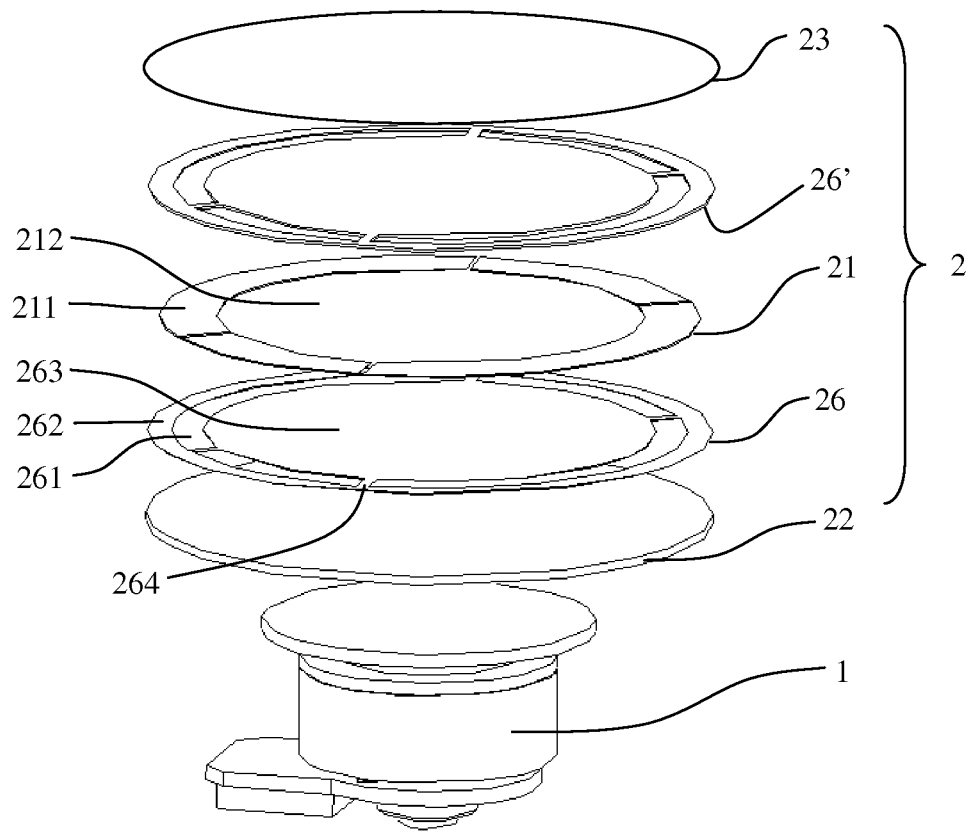
FIG. 4 is a partial exploded view of the structure of a transmission type wavelength conversion wheel device according to an embodiment of the present invention.
Figure 7:
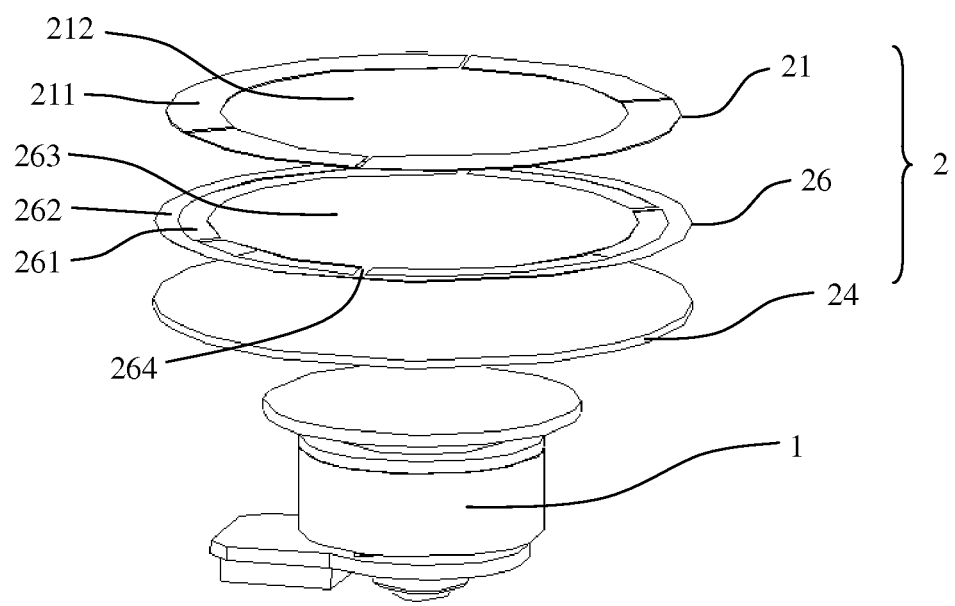
FIG. 7 is a partial exploded view of the structure of a reflection type wavelength conversion wheel device according to an embodiment of the present invention.

FIG. 4 and FIG. 7 each depict a wavelength conversion wheel device of embodiments of the present invention, including a motor 1 and a wavelength conversion wheel 2. The wavelength conversion wheel 2 includes a wavelength conversion material layer 21 and at least one functional layer adjacent the wavelength conversion material layer 21.

Different functional layer are used in the embodiments based on the different working principle of the wavelength conversion wheel 2:

In the reflection type wavelength conversion wheel shown in FIG. 7, the functional layer includes a reflector plate 24, disposed on one side of the wavelength conversion material layer 21, for reflecting the converted light and an unabsorbed portion of the excitation light. The reflector plate 24 may be, for example but not limited to, a metal reflector plate or a glass plate coated with a reflecting film. The excitation light from an excitation light source is incident on the wavelength conversion material layer 21 from the other side (opposite the reflector), and the converted light is also output to the other side of the wavelength conversion material layer 21.

In the transmission type wavelength conversion wheel shown in FIG. 4, the functional layer includes a dichroic reflector plate 22 for transmitting the excitation light and reflecting the converted light. The excitation light is incident on the wavelength conversion material layer 21 from one side, and the converted light is output from the other side of the wavelength conversion material layer 21. To adjust the color or output angle of the output light, the functional layer may further include a filter 23 for selecting the wavelength range or output angle of the output light. The filter 23 and the reflector 22 are respectively disposed on two sides of the wavelength conversion material layer 21.

The wavelength conversion wheel 2 according to embodiments of the present invention further includes at least one spacer layer 26, disposed between the wavelength conversion material layer 21 and the functional layer, such that at the location of the wavelength conversion material, the wavelength conversion material layer is spaced apart from the functional layer by an air gap no thicker than 10% of the width of the wavelength conversion material in the radial direction. Generally, the thinner the air gap the better. Considering the rotation of the wheel relative to the illumination light spot of the excitation light, to reduce material use, the wavelength conversion material is preferably distributed a ring shaped region 211 of the wavelength conversion material layer 21. The spacer layer 26 has a ring shaped hollow region 261 corresponding to the location of the ring shaped region 211. The thickness of the spacer layer 26 is no thicker than 10% of the width of the ring shaped region 211. Taking a light source for a projector as an example (but the invention is not limited thereto), the output light typically include red, green and blue primary colors. In a light source used for such a projector, the wavelength conversion wheel device should include at least two different wavelength conversion materials. Thus, the ring shaped region 211 may be divided into two or more sub-regions for carrying different wavelength conversion materials. Correspondingly, for ease of installation, the spacer layer 26 is preferably a rigid plate having an inner portion and an outer ring and a hollow section 261 separating them, with at least two reinforcing bridges 264 connecting the inner portion and outer ring.

Test shows that a light source device using a wavelength conversion wheel device according to embodiments of the present invention attain over 20% enhancement in output brightness as compared to light sources using a conventional wavelength conversion wheel. The working principle is explained with reference to FIGS. 5 and 6.

Figure 5:
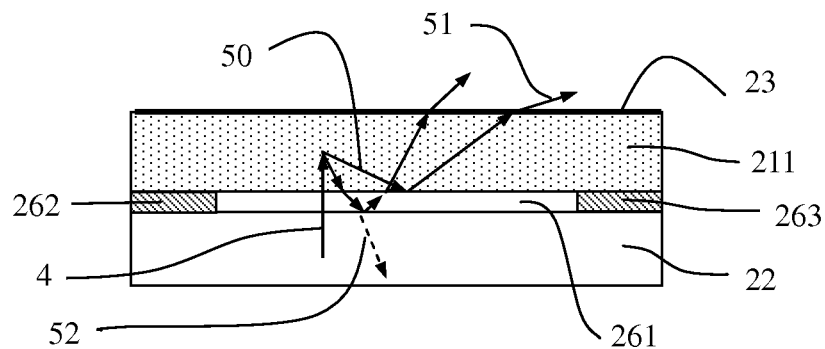
FIG. 5 illustrates the light transmission for the wavelength conversion wheel device of FIG. 4 when a spacer layer is present.

FIG. 5 shows a wheel device employing one spacing layer according to an embodiment of the present invention. As the air gap (e.g. the hollow area 261 defined between the outer ring 262 and the inner region 263 of the spacing layer 26) is filled with a low refractive index material (such as but not limited to air or inert gas), total internal reflection occurs at the boundary of two materials when the light enters the optically less dense material from the optically denser material. Thus, large angle converted light 50 that travels from the wavelength conversion material 211 toward the dichroic reflector 22 is totally reflected at the optical boundary back to the wavelength conversion material 211. As a result, light loss is reduced as compared to conventional technologies.

Figure 6:
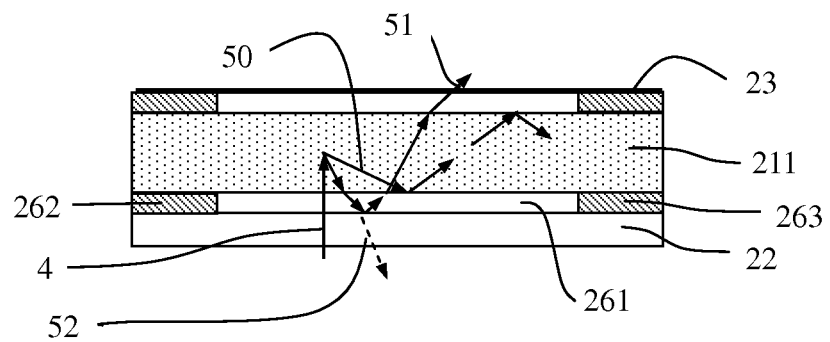
FIG. 6 illustrates the light transmission for the wavelength conversion wheel device of FIG. 4 when two spacer layers are present.

As shown in FIG. 6, when a spacer layer is also present between the wavelength conversion material layer 21 and the filter 23, of the light traveling from the wavelength conversion material 211 toward filter 23, the large angle light will be totally reflected at the boundary back to the wavelength conversion material 211. Light at smaller incident angle such as 51 can pass through the boundary and become output light. The light that is reflected back to the wavelength conversion material 211 can be scattered by the particles in the wavelength conversion material and change angles; portions of the scatter light that has a smaller incident angle will be outputted by the filter 23. As a result, the air gap between the wavelength conversion material 211 and the filter 23 can help reduce the spot size of the output converted light, thereby increasing the output brightness.

To form a secure structure, a clamp structure is preferably employed at the periphery of the wavelength conversion wheel 2 to keep the various layers together. This structure is not shown in the figures. Also, the wavelength conversion material in the various embodiments may be phosphor materials, nano materials, light emitting dye, etc. One or more transparent binding materials may be used to bind the wavelength conversion materials and secure them to form the wavelength conversion material layer 21, to enhance the light output stability of the light source. Using phosphor powder as an example (but not limited to such), the transparent material may be a transparent gel or colloid or a transparent glass, mixed with the phosphor powder to form a desired shape. The transparent material may also be a transparent film, and the phosphor powder can be heat-pressed onto the transparent film.

What is claimed is:

1. A wavelength conversion wheel device comprising:
   a motor; and
   a wavelength conversion wheel,
   wherein the wavelength conversion wheel includes a wavelength conversion material layer which absorbs an excitation light and converts it to a converted light, and a dichroic reflector adjacent the wavelength conversion material layer, the dichroic reflector transmitting an excitation light and reflecting a converted light generated by the wavelength conversion material,
   wherein the wavelength conversion wheel further includes a first spacing layer disposed between the wavelength conversion material layer and the dichroic reflector, such that at a location of a wavelength conversion material on the wavelength conversion material layer, the wavelength conversion material layer is spaced apart from the dichroic reflector by a first gap no thicker than 10% of a width of the wavelength conversion material in a radial direction, and a filter, where the filter and the dichroic reflector are respectively disposed on two sides of the wavelength conversion material layer, and wherein the filter is used to select the wavelength range or output angle of the output light;

wherein the wavelength conversion wheel further includes a second spacing layer disposed between the wavelength conversion material layer and the filter, such that at a location of the wavelength conversion material on the wavelength conversion material layer, the wavelength conversion material layer is spaced apart from the filter by a second gap, and wherein the thickness of the first gap and a thickness of the second gap are defined by the first and second spacing layer, respectively and are fixed.

2. The wavelength conversion wheel device of claim 1, wherein the ring shaped area is divided into two or more segments, for carrying different wavelength conversion materials.

3. The wavelength conversion wheel device of claim 2, wherein the first spacing layer is a rigid plate having an inner portion and an outer ring connected by at least two reinforced bridges, the inner portion and the outer ring being separated by the hollow region.

4. The wavelength conversion wheel device of claim 1, wherein the first gap is filled with a low refractive index material.

5. The wavelength conversion wheel device of claim 4, wherein the first gap is filled with air.

6. The wavelength conversion wheel device of claim 1, wherein the wavelength conversion material is distributed in a ring shaped area of the wavelength conversion material layer, wherein the first spacing layer includes a hollow region at a location corresponding to the ring shaped area, and wherein a thickness of the spacer layer is less than 10% of a width of the ring shaped area.

\* \* \* \* \*